(12) United States Patent
Schramm et al.

(10) Patent No.: US 8,101,687 B2
(45) Date of Patent: *Jan. 24, 2012

(54) MULTIMODAL POLYETHYLENE MATERIAL

(75) Inventors: Detlef Schramm, Hombrechtikon (CH);
Wolfgang Quack, Mettmann (DE);
Julien Damen, Mettmenstetten (CH);
Pak-Meng Cham, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/634,503

(22) Filed: Dec. 6, 2006

(65) Prior Publication Data

US 2007/0112160 A1 May 17, 2007

Related U.S. Application Data

(63) Continuation of application No. 10/484,906, filed as application No. PCT/US02/27503 on Aug. 28, 2002, now Pat. No. 7,250,473.

(60) Provisional application No. 60/316,401, filed on Aug. 31, 2001.

(51) Int. Cl.
C08L 23/04 (2006.01)
C08L 23/08 (2006.01)

(52) U.S. Cl. ............. 525/240; 526/348; 526/348.1; 526/348.2

(58) Field of Classification Search ............... 525/240; 526/348, 348.1
See application file for complete search history.

(56) References Cited

U.S. PATENT DOCUMENTS

| | | |
|---|---|---|
| 3,645,992 A | 2/1972 | Elston |
| 3,914,342 A | 10/1975 | Mitchell |
| 4,438,238 A | 3/1984 | Fukushima et al. |
| 4,461,873 A | 7/1984 | Bailey et al. |
| 4,547,551 A | 10/1985 | Bailey et al. |
| 4,798,081 A | 1/1989 | Hazlitt et al. |
| 4,859,749 A | 8/1989 | Franke et al. |
| 4,937,299 A | 6/1990 | Ewen et al. |
| 5,055,438 A | 10/1991 | Canich |
| 5,064,802 A | 11/1991 | Stevens et al. |
| 5,089,321 A | 2/1992 | Chum et al. |
| 5,132,380 A | 7/1992 | Stevens et al. |
| 5,189,192 A | 2/1993 | LaPointe et al. |
| 5,218,071 A | 6/1993 | Tsutsui et al. |
| 5,272,236 A | 12/1993 | Lai et al. |
| 5,278,272 A | 1/1994 | Lai et al. |
| 5,374,696 A | 12/1994 | Rosen et al. |
| 5,453,410 A | 9/1995 | Kolthammer et al. |
| 5,470,993 A | 11/1995 | Devore et al. |
| 5,494,874 A | 2/1996 | Rosen et al. |
| 5,532,394 A | 7/1996 | Rosen et al. |
| 5,539,076 A | 7/1996 | Nowlin et al. |
| 5,582,923 A | 12/1996 | Kale et al. |
| 5,631,069 A | 5/1997 | Wooster et al. |
| 5,665,800 A | 9/1997 | Lai et al. |
| 5,674,945 A | 10/1997 | Takahashi et al. |
| 5,773,155 A | 6/1998 | Kale et al. |
| 5,844,045 A | 12/1998 | Kolthammer et al. |
| 5,858,491 A | 1/1999 | Geussens et al. |
| 5,863,665 A | 1/1999 | Kale et al. |
| 5,908,679 A | 6/1999 | Berthold et al. |
| 6,136,924 A | 10/2000 | Promel et al. |
| 6,194,520 B1 | 2/2001 | Cheruvu et al. |
| 6,225,421 B1 | 5/2001 | Promel et al. |
| 6,403,717 B1 * | 6/2002 | Adams et al. .............. 525/191 |
| 6,462,135 B1 | 10/2002 | Rohde et al. |
| 6,545,093 B1 | 4/2003 | de Lange et al. |
| 6,787,608 B2 | 9/2004 | VanDun et al. |
| 7,250,473 B2 | 7/2007 | Schramm et al. |
| 7,411,023 B2 | 8/2008 | Palmlof |
| 2005/0228139 A1 | 10/2005 | Lee et al. |

FOREIGN PATENT DOCUMENTS

| | | |
|---|---|---|
| EP | 036660 | 9/1981 |
| EP | 046537 | 3/1982 |
| EP | 0100843 A1 | 2/1984 |
| EP | 0100843 A1 | 2/1984 |
| EP | 0100843 B1 | 4/1987 |
| EP | 0302242 A1 | 2/1989 |
| EP | 0302242 A1 | 2/1989 |
| EP | 0308088 A2 | 3/1989 |
| EP | 0308088 A2 | 3/1989 |
| EP | 0416815 A2 | 8/1990 |
| EP | 0416815 | 3/1991 |
| EP | 0423962 A2 | 4/1991 |
| EP | 0423962 A2 | 4/1991 |
| EP | 423962 A2 * | 4/1991 |
| EP | 0492656 A1 | 7/1992 |
| EP | 0492656 A1 | 7/1992 |

(Continued)

OTHER PUBLICATIONS

Bengt Hagstrom, Prediction of melt flow rate (MFR) of bimodal polyethylene's based on MFR of their components, Swedish Institute for Fibre and Polymer Reasearch, 1997, p. 4:13, Sweden.
ELTEX TUB 131 N2010, Compound for pipes and fittings, SOLVAY polyethylene, 1996.
Interim Australian Standard, PE pipe compounds, AS 4131 (Int)-1993, Standards Association of Australia.
ISO/FDIS 10508:1995, Plastics piping systems for hot and cold water installations—Guidance for classification and design.
Niel Campbell; Notice of Opposition to European Patent; EPO Form 2300.404.93(int.ad.Dec. 1997) p. 4; dated Oct. 19, 2005 which includes Notice of Opposition regarding EP No. 1425344.
J.P.H. Smith's GA No. 49650, correspondence dated Oct. 25, 2005, regarding EP 1425344B; Dow Global Technologies, Inc. Opposition, OP008.

(Continued)

*Primary Examiner* — Roberto Rabago

(57) ABSTRACT

The present invention relates to a polyethylene resin having a multimodal molecular weight distribution, said resin being further characterized in that it has a density in the range of from about 0.925 g/ccm to about 0.950 g/ccm, a melt index ($I_2$) In the range of from about 0.05 g/10 min to about 5 g/10 min, and in that it comprises at least one high molecular weight (HMW) ethylene interpolymer and at least a low molecular weight (LMW) ethylene polymer, and a composition comprising such resin. Also provided is a shaped article comprising said resin or composition, in particular a pipe.

22 Claims, No Drawings

FOREIGN PATENT DOCUMENTS

| | | |
|---|---|---|
| EP | 0 503 791 | 9/1992 |
| EP | 0528523 | 2/1993 |
| EP | 0533154 A1 | 3/1993 |
| EP | 0533154 A1 | 3/1993 |
| EP | 0603935 A1 | 6/1994 |
| EP | 0603935 A1 | 6/1994 |
| EP | 739937 | 10/1996 |
| EP | 0739937 A1 | 10/1996 |
| EP | 0773258 A2 | 5/1997 |
| EP | 0773258 A2 | 5/1997 |
| EP | 778289 | 6/1997 |
| EP | 0778289 A1 | 6/1997 |
| EP | 0783022 A1 | 7/1997 |
| EP | 0783022 A1 | 7/1997 |
| EP | 0794200 | 9/1997 |
| EP | 0881237 A1 | 12/1998 |
| EP | 0881237 A1 | 12/1998 |
| EP | 0897934 A1 | 2/1999 |
| EP | 0897934 A1 | 2/1999 |
| EP | 0905153 A1 | 3/1999 |
| EP | 0905153 A1 | 3/1999 |
| EP | 1041090 A1 | 10/2000 |
| EP | 1041090 A1 | 10/2000 |
| EP | 1201711 A1 | 5/2002 |
| EP | 1201711 A1 | 5/2002 |
| EP | 1 448 702 | 8/2004 |
| JP | H9-194643 | 7/1997 |
| JP | 1998237235 | 9/1998 |
| JP | 1998237235 A | 9/1998 |
| JP | 1999106574 | 4/1999 |
| JP | 1999106574 A | 4/1999 |
| WO | 93/07187 | 4/1993 |
| WO | 93/07188 | 4/1993 |
| WO | 93/07189 | 4/1993 |
| WO | WO-93/07187 | 4/1993 |
| WO | WO-93/07188 | 4/1993 |
| WO | WO-93/07189 | 4/1993 |
| WO | WO-94/25523 | 11/1994 |
| WO | WO-95/05419 | 2/1995 |
| WO | WO-95/30713 | 11/1995 |
| WO | WO-96/18662 | 6/1996 |
| WO | WO-97/03124 | 1/1997 |
| WO | 97/29152 | 8/1997 |
| WO | WO-97/29152 | 8/1997 |
| WO | WO-99/14271 | 3/1999 |
| WO | 99/14271 | 4/1999 |
| WO | WO99/35652 | 7/1999 |
| WO | 00/01765 | 1/2000 |
| WO | WO-00/01765 | 1/2000 |
| WO | WO-00/06646 | 2/2000 |
| WO | 00/18814 | 4/2000 |
| WO | WO-00/18814 | 4/2000 |
| WO | WO-00/22040 | 4/2000 |
| WO | WO-00/24821 | 5/2000 |
| WO | WO-00/40620 | 7/2000 |
| WO | 01/02480 A1 | 1/2001 |
| WO | WO-01/02480 A1 | 1/2001 |
| WO | 01/25328 A1 | 4/2001 |
| WO | WO-01/25328 A1 | 4/2001 |
| WO | WO-02/36678 | 5/2002 |
| WO | WO-02/36678 A1 | 5/2002 |
| WO | WO-03/020821 | 3/2003 |

OTHER PUBLICATIONS

Francis Leyder's,Total Petrochemcials, Correspondence dated Oct. 26, 2005, regarding KS/OPP-50 EP; EP 14253441; "Multimodal polyethylene material" including Opposition by Total Petrochemicals Research Feluy.

EPO—Munich, Confirmation dated Oct. 29, 2005 of Receiving Basell Hoffman correspondence and /Dr.Enderle Test Report, dated Oct. 24, 2005 regarding EP 1425344 and opponent Basell Polyolefins, GmbH, Germany.

Hoffman correspondence and /Dr.Enderle Test Report, dated Oct. 24, 2005 regarding EP 1425344 and opponent Basell Polyolefins, GmbH, Germany.

Hoffman correspondence and /Dr.Enderle Test Report, dated Oct. 24, 2005 regarding EP 1425344 and opponent Basell Polyolefins, GmbH, Germany. (English Translation).

EPO-Munich, Confirmation dated Oct. 31, 2005 of Receiving J.P.H. Smith's GA No. 49650, correspondence dated Oct. 25, 2005, regarding EP 14253448; Dow Global Technologies, Inc. Opposition, OP008.

EPO-Munich, Confirmation on Oct. 31, 2005, of Receiving Francis Leyder's,Total Petrochemcials, Correspondence dated Oct. 21, 2005, regarding KS/OPP-50 EP; EP 1425344 B1; Multimodal polyethylene material.

EPO Munich, Confirmation dated Aug. 11, 2006 to Adrian Hayes' Correspondence from Boult Wade Tennant dated Aug. 9, 2006, regarding EP1425344; Application No. 02759487.8-2109 Opposition.

Adrian Hayes; Correspondence from Boult Wade Tennant dated Aug. 9, 2006, regarding EP1425344; Application No. 02759487.8-2109 Opposition.

EPO-Munich, Confirmation on Apr. 28, 2007 of Receiving Micheline Roufosse's Total Petrochemcials, Correspondence dated Apr. 17, 2007, regarding MCR/OPP-50 EP; EP Application No. 02 759 487.8; EP 1425344 B1.

Micheline Roufosse, Total Petrochemcials, Correspondence dated Apr. 17, 2007, regarding MCR/OPP-50 EP; EP Application No. 02 759 487.8; EP 1425344 B1.

Hoffmann, Basell Polyolefins, GmbH; Correspondence dated Mar. 12, 2007, regarding EP 1 425 344; Application No. 02 759 487.8 (English Translation).

EPO-Munich, Confirmation date Mar. 13, 2007 of receiving Hoffmann, Basell Polyolefins, GmbH; Correspondence dated Mar. 12, 2007, regarding EP 1 425 344; Application No. 02 759 487.8.

Non Patent Lit submitted in EP Opposition; ELTEX; Solvay polyetheylene; Compound for pipes and fittings. ELTEXTUB 131 N2010, 1996.

Non Patent Lit submitted in EP Opposition—ISO(International Organization of Standardization; ISO/FDIS;Plastic piping systems for hot and cold water installations—Guidance for classification and design, 2005.

Interim Austalian Standard PE pipe compounds; AS 4131(int)-1993.

Bengt Hagström, Prediction of melt flow rate (MFR) of bimodal polyethylene's based on MFR of their components, Swedish Institute for Fibre and Polymer Reasearch, 1997, p. 4:13, Sweden.

ELTEX TUB 131 N2010. Compound for pipes and fittings, SOLVAY polyethylene .

Interim Australian Standard, PE pipe compounds, AS 4131 (Int)—1993, Standards Association of Australia.

ISO/FDIS 10508:1995, Plastics piping systems for hot and cold water installations—Guidance for classification and design.

Wild et al, Journal of Polymer Science, Poly. Phys. Ed., vol. 20, p. 441 (1982).

Scheirs et al, PE100 resins for pipe applications: continuing the development into the 21st century, *Trends in Polymer Science*, 4, 12, 408-415, Dec. 1996.

EP Opposition—Summons to Attend Oral Proceedings Nov. 30, 2007; 7 pages.

EP Opposition—Final Sub. from Borealis Tech. Oy before hearing Dec. 11, 2008; 13 pages.

EP Opposition—Patent Proprietor's Response Dec. 11, 2008; 16 pages.

EP Opposition—Requests from Patent Proprietor Jan. 29, 2009; 13 pages.

EP Opposition—Decision on Opposition Feb. 20, 2009; 9 pages.

EP Opposition—Patentee's Appeal Apr. 30, 2009; 1 page.

EP Opposition—Response from Basell Jan. 06, 2010; 4 pages.

U.S. Appl. No. 60/316,401.

Scheirs et al., PE100 Resins for Pipe Applications, TRIP, Dec. 1996, pp. 408-415.

Wild et al., Determination of Branching Distributions in Polyethylene and Ethylene Copolymers, J. of Polymer Sci., 1982, pp. 441-455, vol. 20.

\* cited by examiner

MULTIMODAL POLYETHYLENE MATERIAL

The present application is a continuation application of U.S. Application No. 10/484,906, filed Aug. 10, 2004, now U.S. Pat. No. 7,250,473, which is a 35 U.S.C. §371 National Stage of International Application No. PCT/US02/27503, filed on Aug. 28, 2002, which claims the benefit of U.S. Provisional Application No. 60/316,401, filed Aug. 31, 2001; each application is incorporated herein, in its entirety, by reference.

The present invention relates to a multimodal polyethylene resin, a composition comprising such resin and to applications of such resin or composition, for example to make a shaped article. The resin and composition of the invention are particularly suitable for use in pipes.

Polyethylene compositions with a multimodal molecular weight distribution (MWD), for example a bimodal MWD, can offer distinct advantages compared with unimodal polyethylenes or other polyolefins. For example, bimodal polyethylenes may combine the favorable mechanical properties afforded by a high molecular weight polyethylene with the good processability of a low molecular weight polyethylene. The prior art reports that such materials can advantageously be employed in various applications, including film or pipe applications. Prior art multimodal polyethylenes suggested for use in pipes include the materials disclosed in the PCT applications with the publication numbers WO 97/29152, WO 00/01765, WO 00/18814, WO 01/02480 and WO 01/25328.

In view of the potentially disastrous consequences of material failures, acceptance of any plastic pipe for water or gas distribution is subject to product standards and performance requirements set forth in norms, for example, DIN (German Instrustrial Norm or "Deutsche Industrie Norm") or norms defined by ISO (International Organization for Standardization, Geneva, Switzerland). For example, state of the art polyethylene materials sold into pipe applications, such as pressure pipes or irrigation pipes, meet the so-called PE80 or PE100 ratings (PE stands for polyethylene). Pipes manufactured from polyethylenes classifying as PE80-type or PE100-type resins must withstand a minimum circumferential stress, or hoop stress, of 8 MPa (PE80) or 10 MPa (PE100) at 20° C. for 50 years. PE100 resins are high density polyethylene (HDPE) grades typically having a density of at least about 0.950 g/ccm$^3$ or higher.

Their relatively poor Long Term Hydrostatic Strength (LTHS) at high temperatures has been an acknowledged disadvantage of traditional polyethylenes which rendered these materials unsuitable for use in piping with exposure to higher temperatures, such as domestic pipe applications. Domestic pipe systems typically operate at pressures between about 2 and about 10 bar and temperatures of up to about 70° C. with malfunction temperatures of about 95-100° C. Domestic pipes include pipes for hot and/or cold water in pressurized heating and drinking water networks within buildings as well as pipes for snow melt or heat recovery systems. The performance requirements for the various classes of hot water pipes, including underfloor heating, radiator connectors and sanitary pipes are specified, for example, in International Standard ISO 10508 (first edition Oct. 15, 1995, "Thermoplastic pipes and fittings for hot and cold water systems").

Materials which are typically used for piping with exposure to higher temperatures include polybutylene, random copolymer polypropylene and cross-linked polyethylene (PEX). The crosslinking of the polyethylene is needed to obtain the desired LTHS at high temperatures. The crosslinking can be performed during extrusion, resulting in lower output, or in a post extrusion process. In both cases crosslinking generates significantly higher costs than thermoplastic pipe extrusion.

Polyethylenes of Raised Temperature Resistance (PE-RT), as defined in ISO-1043-1, are a class of polyethylene materials for high temperature applications which has recently been introduced to the pipe market. Present PE-RT resins compare unfavorably with PEX materials in some respects, for example, in that the walls of PE-RT based pipes need to be thicker than those of PEX-based pipes due to lower stress ratings.

There still is the need for new polyethylene materials which offer an advantageously balanced combination of thermal, mechanical and processing properties. In particular, there still is the need for new polyethylene materials, which afford superior high temperature resistance (e.g., in the range of operating temperatures from about 40° C. to about 80° C. and test temperatures of up to about 110° C.), high stress resistance, good tensile and impact performance and excellent processability without having to be crosslinked. It is an object of the present invention to meet these and other needs.

The present invention provides a polyethylene resin with a multimodal molecular weight distribution. Said multimodal polyethylene resin is characterized in that it has a density in the range of from about 0.925 g/ccm to about 0.950 g/ccm and a melt index in the range of from about 0.05 g/10 min to about 5 g/10 min.

The present invention also provides a composition comprising such multimodal polyethylene resin and at least one other component.

Other aspects of the invention relate to applications of such multimodal polyethylene resin and composition and to shaped articles made from such polyethylene resin or composition. One particular embodiment of the present invention relates to durable applications, such as pipes.

The term "comprising" as used herein means "including".

The term "interpolymer" is used herein to indicate polymers prepared by the polymerization of at least two monomers. The generic term interpolymer thus embraces the terms copolymer, usually employed to refer to polymers prepared from two different monomers, and polymers prepared from more than two different monomers, such as terpolymers.

Unless indicated to the contrary, all parts, percentages and ratios are by weight. The expression "up to" when used to specify a numerical range includes any value less than or equal to the numerical value which follows this expression. The expression "from to" when used to specify a numerical range includes any value equal to or higher than the numerical value which follows this expression. In these contexts, the word "about" is used to indicate that the specified numerical limit represents an approximate value which may vary by 1%, 2%, 5% or sometimes 10%.

"HMW" stands for high molecular weight, "LMW" stands for low molecular weight.

The abbreviation "ccm" stands for cubic centimeters.

Unless expressly specified otherwise, the term "melt index" means the $I_2$ melt index, as determined in accordance with ASTM D1238 under a load of 2.16 kg and at a temperature of 190° C.

Unless specified otherwise, the term "alpha-olefin" (α-olefin) refers to an aliphatic or cyclo-aliphatic alpha-olefin having at least 4, preferably from 4 to 20 carbon atoms.

The present invention provides a polyethylene resin having a multimodal molecular weight distribution, said resin being further characterized in that it has (a) a density in the range of from about 0.925 g/ccm, preferably of from about 0.935 g/ccm, to about 0.950 g/ccm, preferably to about 0.945 g/ccm, and (b) a melt index ($I_2$) in the range of from about 0.05 g/10 min, preferably of from about 0.1 g/10 min, to about 5 g/10 min, preferably to about 1 g/10 min.

Said multimodal polyethylene resin comprises at least one high molecular weight (HMW) ethylene interpolymer and at least a low molecular weight (LMW) ethylene polymer. The HMW interpolymer has a significantly higher weight average molecular weight than the LMW polymer. Said difference in molecular weight is reflected in distinct melt indices. Preferred is a multimodal polyethylene resin which has a trimodal or, most preferably, a bimodal molecular weight distribution. A bimodal polyethylene resin according to the present invention consists of one unimodal HMW ethylene interpolymer and one unimodal LMW ethylene polymer.

The HMW component characterizing the multimodal polyethylene resin of the invention comprises at least one or more, preferably one HMW ethylene interpolymer. Such ethylene interpolymer is characterized by a density in the range of from about 0.910 g/ccm, preferably of from about 0.915 g/ccm, to about 0.935 g/ccm, preferably to about 0.925 g/ccm, and a melt index of about 1.0 g/10 min or lower, preferably of about 0.05 g/10 min or lower. Advantageously, the HMW ethylene interpolymer has a melt index of about 0.02 g/10 min or higher. The HMW ethylene interpolymer contains ethylene interpolymerized with at least one alpha-olefin, preferably an aliphatic $C_4$-$C_{20}$ alpha-olefin, and/or a non-conjugated $C_6$-$C_{18}$ diolefin, such as 1,4-hexadiene or 1,7-octadiene. Although the HMW interpolymer can be a terpolymer, the preferred interpolymer is a copolymer of ethylene and an aliphatic alpha-olefin, more preferably such an alpha-olefin which has from four to ten carbon atoms. Particularly preferred aliphatic alpha-olefins are selected from the group consisting of butene, pentene, hexene, heptene and octene. Advantageously, the HMW component is present in an amount of from about 30 weight percent, preferably of from about 40 percent, to about 60 weight percent, preferably to about 50 percent (based on the total amount of polymer in the multimodal polyethylene resin). More preferably, the HMW component is present in an amount of from about 40 to about 55 percent. The molecular weight distribution as reflected by the $M_w/M_n$ ratio of the HMW component is relatively narrow, preferably less than about 3.5, more preferably less than about 2.4.

The LMW component characterizing the multimodal polyethylene resin of the invention comprises at least one or more, preferably one LMW ethylene polymer. The LMW ethylene polymer is characterized by a density in the range of from about 0.945 g/ccm to about 0.965 g/ccm and a melt index of at least about 2.0 g/10 min or higher, preferably of at least about 5 g/10 min, more preferably of at least about 15 g/10 min or higher. Advantageously, the LMW component has a melt index of less than 2000 g/10 min, preferably of less than 200 g/10 min. A preferred LMW ethylene polymer is an ethylene interpolymer having a density in the range of from about 0.950 g/ccm to about 0.960 g/ccm and a melt index of at least about 2 g/10 min, preferably in the range of from about 10 g/10 min to about 150 g/10 min. Preferred LMW ethylene interpolymers are ethylene/alpha-olefin copolymers, particularly such copolymers wherein the aliphatic alpha-olefin comonomer has from four to ten carbon atoms. The most preferred aliphatic alpha-olefin comonomers are selected from the group consisting of butene, pentene, hexene, heptene and octene. Advantageously, the LMW component is present in an amount of from about 40 weight percent, preferably of from about 50 percent, to about 70 weight percent, preferably to about 60 percent (based on the total amount of polymers comprised in the multimodal polyethylene resin of the invention). More preferably, the LMW component is present in an amount of from about 45 to about 60 percent.

While the alpha-olefins incorporated into a HMW component and into a LMW component comprised in a multimodal polyethylene resin of the invention may be different, preferred are such multimodal polyethylene resins, wherein the HMW and the LMW interpolymers incorporate the same type of alpha-olefin, preferably 1-butene, 1-pentene, 1-hexene, 1-heptene or 1-octene. Typically, the comonomer incorporation in the HMW ethylene interpolymer is higher than in the LMW polymer.

The multimodality of a polyethylene resin according to the present invention can be determined according to known methods. A multimodal molecular weight distribution (MWD) is reflected in a gel permeation chromatography (GPC) curve exhibiting two or more component polymers wherein the number of component polymers corresponds to the number of discernible peaks, or one component polymer may exist as a hump, shoulder or tail relative to the MWD of the other component polymer.

For example, a bimodal MWD can be deconvoluted into two components: the HMW component and the LMW component. After deconvolution, the peak width at half maxima (WAHM) and the weight average molecular weight ($M_w$) of each component can be obtained. Then the degree of separation ("DOS") between the two components can be calculated by the following equation:

$$DOS = \frac{M_w^H - M_w^L}{WAHM^H + WAHM^L}$$

wherein $M_w^H$ and $M_w^L$ are the respective weight average molecular weight of the HMW component and the LMW component; and $WAHM^H$ and $WAHM^L$ are the respective peak width at the half maxima of the deconvoluted molecular weight distribution curve for the HMW component and the LMW component. The DOS for the bimodal resins according to the invention is at least 0.01 or higher, preferably higher than about 0.05, 0.1, 0.5, or 0.8.

WO 99/14271 also describes a suitable deconvolution technique for multicomponent polymer blend compositions.

Preferably, the HMW component and the LMW component are each unimodal. The MWD in the GPC curves of the individual components, e.g. the HMW component and the LMW component, respectively, does not substantially exhibit multiple component polymers (i.e. no humps, shoulders or tails exist or are substantially discernible in the GPC curve). Each molecular weight distribution is sufficiently narrow and their average molecular weights are different. The ethylene interpolymers suitable for use as HMW and/or LMW component include both homogeneously branched (homogeneous) interpolymers and heterogeneously branched (heterogeneous) interpolymers.

Homogeneous ethylene interpolymers for use in the present invention encompass ethylene-based interpolymers in which any comonomer is randomly distributed within a given interpolymer molecule and wherein all of the interpolymer molecules have substantially the same ethylene/comonomer ratio. Homogeneous ethylene interpolymers are generally characterized as having an essentially single melting (point) peak between −30° C. and 150° C., as determined by differential scanning calorimetry (DSC). Typically, homogeneous ethylene interpolymers also have a relatively narrow molecular weight distribution (MWD) as compared to corresponding heterogeneous ethylene interpolymers. Preferably, the molecular weight distribution defined as the ratio of weight average molecular weight to number average molecular weight ($M_w/M_n$), is less than about 3.5. Furthermore, the homogeneity of the ethylene interpolymers is reflected in a narrow composition distribution, which can be measured and expressed using known methods and parameters, such as SCBDI (Short Chain Branch Distribution Index) or CDBI (Composition Distribution Breadth Index). The SCBDI of a polymer is readily calculated from data obtained from techniques known in the art, such as, for example, temperature rising elution fractionation (typically abbreviated as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. CDBI is defined as the weight percent of the polymer molecules having a comonomer content within 50 percent of the median total molar comonomer content. The SCBDI or CDBI for the homogeneous ethylene/alpha-olefin interpolymers used in the present invention is typically higher than about 50 percent.

The homogeneous ethylene interpolymers which can be used in the present invention fall into two categories, the linear homogeneous ethylene interpolymers and the substantially linear homogeneous ethylene interpolymers. Both are known in the art and commercially available.

Homogeneous linear ethylene interpolymers are interpolymers which have a homogeneous short chain branching distribution and lack measurable or detectable long chain branching. Such homogeneous linear ethylene interpolymers can be made using polymerization processes which provide a uniform branching distribution, e.g., the process described by Elston in U.S. Pat. No. 3,645,992, who uses soluble vanadium catalyst systems. Other single-site catalyst systems including metallocene catalyst systems, e.g., of the type disclosed in U.S. Pat. No. 4,937,299 to Ewen et al., or U.S. Pat. No. 5,218,071 to Tsutsui et al., are also suitable for the preparation of homogeneous linear ethylene interpolymers.

The substantially linear ethylene interpolymers (SLEPs) are homogeneous interpolymers having long chain branching, meaning that the bulk ethylene interpolymer is substituted, on average, with about 0.01 long chain branches/1000 total carbons to about 3 long chain branches/1000 total carbons (wherein "total carbons" includes both backbone and branch carbon atoms). Preferred polymers are substituted with about 0.01 long chain branches/1000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons. The presence of long chain branches in such ethylene interpolymers can be determined according to methods known in the art, such as gel permeation chromatography coupled with a low angle laser light scattering detector (GPC-LALLS) and gel permeation chromatography coupled with a differential viscometer detector (GPC-DV).

For substantially linear ethylene polymers, the presence of long chain branching is manifest from enhanced rheological properties which can be quantified and expressed, for example, in terms of gas extrusion rheometry (GER) results and/or melt flow ratio ($I_{10}/I_2$) increases. The melt flow ratio of the substantially linear ethylene/alpha-olefin interpolymers can be varied essentially independently of the molecular weight distribution ($M_w/M_n$ ratio).

The substantially linear ethylene polymers are a unique class of compounds which has been described in numerous publications, including e.g., U.S. Pat. No. 5,272,236, U.S. Pat. No. 5,278,272, and U.S. Pat. No. 5,665,800, each of which is incorporated herein by reference. Such SLEPs are available, for example, from The Dow Chemical Company as polymers made by the INSITE™ Process and Catalyst Technology, such as AFFINITY™ polyolefin plastomers (POPs).

Preferably, SLEPs are prepared using a constrained geometry catalyst. Such catalyst may be further described as comprising a metal coordination complex comprising a metal of groups 3-10 or the Lanthanide series of the Periodic Table of the Elements and a delocalized pi ($\pi$)-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. Suitable constrained geometry catalysts for manufacturing substantially linear ethylene polymers include, for example, the catalysts as disclosed in U.S. Pat. No. 5,055,438; U.S. Pat. No. 5,132,380; U.S. Pat. No. 5,064,802; U.S. Pat. No. 5,470,993; U.S. Pat. No. 5,453,410; U.S. Pat. No. 5,374,696; U.S. Pat. No. 5,532,394; U.S. Pat. No. 5,494,874; and U.S. Pat. No. 5,189,192, the teachings of all of which are incorporated herein by reference.

The catalyst system further comprises a suitable activating cocatalyst.

Suitable cocatalysts for use herein include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. Aluminoxanes, including modified methyl alunminoxanes, when used in the polymerization, are preferably used such that the catalyst residue remaining in the (finished) polymer is preferably in the range of from about 0 to about 20 ppm aluminum, especially from about 0 to about 10 ppm aluminum, and more preferably from about 0 to about 5 ppm aluminum. In order to measure the bulk polymer properties, aqueous HCl is used to extract the aluminoxane from the polymer. Preferred cocatalysts, however, are inert, noncoordinating, boron compounds such as those described in EP-A-0520732, the disclosure of which is incorporated herein by reference.

Substantially linear ethylene interpolymers are produced via a continuous (as opposed to a batch) controlled polymerization process using at least one reactor (e.g., as disclosed in WO 93/07187, WO 93/07188, and WO 93/07189, the disclosure of each of which is incorporated herein by reference), but can also be produced using multiple reactors (e.g., using a multiple reactor configuration as described in U.S. Pat. No. 3,914,342, the disclosure of which is incorporated herein by reference) at a polymerization temperature and pressure sufficient to produce the interpolymers having the desired properties. The multiple reactors can be operated in series or in parallel, with at least one constrained geometry catalyst employed in at least one of the reactors.

Substantially linear ethylene polymers can be prepared via continuous solution, slurry, or gas phase polymerization in the presence of a constrained geometry catalyst, e.g. according to the method disclosed in EP-A-416,815, the disclosure of which is incorporated herein by reference. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous loop-reactor solution polymerization process is used to manufacture the substantially linear ethylene polymer used in the present invention.

In general, the continuous polymerization required to manufacture substantially linear ethylene polymers may be accomplished at conditions well known in the art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired.

A support may be employed in the polymerization, but preferably the catalysts are used in a homogeneous (i.e., soluble) manner. It will, of course, be appreciated that the active catalyst system forms in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

Heterogeneous ethylene-based polymers encompass ethylene/α-olefin interpolymers characterized as having a linear backbone and a DSC melting curve having a distinct melting point peak greater than 115° C. attributable to a high density fraction. Such heterogeneous interpolymers typically have a broader molecular weight distribution than comparable homogeneous interpolymers. Typically, heterogeneous ethylene interpolymers have a CDBI of about 50% or less, indicating that such interpolymers are a mixture of molecules having differing comonomer contents and differing amounts of short chain branching. The heterogeneous ethylene polymers that can be used in the practice of this invention include those prepared with a coordination catalyst at high temperature and relatively low pressure. Ethylene polymers and copolymers prepared by the use of a (multi-site) coordination catalyst, such as a Ziegler-Natta catalyst or a Phillips catalyst, are generally known as linear polymers because of the substantial absence of branch chains of polymerized monomer units pendant from the backbone.

The HMW ethylene interpolymer can be a heterogeneous interpolymer or a homogeneous interpolymer, a homogeneous interpolymer being preferred. Particularly preferred HMW ethylene interpolymers are homogeneous, substantially linear HMW ethylene interpolymers. The LMW ethylene interpolymer can be a heterogeneous interpolymer or a homogeneous interpolymer, a heterogeneous interpolymer being preferred.

The multimodal polyethylene resin of the invention may be prepared by any method suitable for homogeneously blending ethylene-based polymers. For example, the HMW and the LMW component can be blended by mechanical means in the solid state, for example, in powder or granular form, followed by melting one or both, preferably both of the components, using devices and equipment known in the art. Preferably, the multimodal resin of the present invention is made by in-situ blending of the HMW component with the LMW component, e.g. using two or more reactors, operated sequentially or in parallel. According to a preferred technique, the multimodal polyethylene resin of the invention is made via the interpolymerization of ethylene and the desired comonomer or comonomers, such as an aliphatic $C_4$-$C_{10}$ alpha-olefin using a single site catalyst, e.g. a constrained geometry catalyst in at least one reactor and a multi site catalyst in at least one other reactor. The reactors can be operated in parallel or, preferably, sequentially. Preferably, the single site catalyst, e.g. the constrained geometry catalyst is in the first reactor, and the multi site catalyst in the second reactor.

Most especially, a dual sequential polymerization system is used. In a preferred embodiment of the invention, the sequential polymerization is conducted such that fresh catalyst is separately injected in each reactor. Preferably, where separate catalyst injection into each reactor is, no (or substantially no) live polymer or active catalyst is carried over from the first reactor into the second reactor as the polymerization in the second reactor is accomplished only from the injection of a fresh catalyst and monomer (and comonomer) thereto.

In another preferred embodiment, the composition is manufactured using a multiple reactor system (preferably a two reactor system) in series with flesh catalyst feed injection of a soluble catalyst system into the first reactor only with process adjustments being made such that live polymer and/or catalyst species is carried over from the first reactor to a subsequent reactor to effect polymerization with fresh monomer and optionally comonomer.

Most preferably, whether separate injection into each reactor is used or injection into the first reactor is used, the resulting resin is characterized as comprising component polymers having distinct, unimodal molecular weight distributions.

Most preferred is a multimodal polyethylene resin comprising a HMW interpolymer designated herein as preferred, more preferred or particularly preferred and a LMW polymer designated herein as preferred, more preferred or particularly preferred, including the bimodal polyethylene resin used to exemplify the present invention.

The present invention also provides compositions comprising the multimodal polyethylene resin of the invention and at least one other additional component. Preferably, such additional component is added to the multimodal polyethylene resin of the invention. Suitable additional components include, for example, other polymers, fillers or additives—with the proviso that these additional components do not adversely interfere with the desired advantageous properties of the multimodal polyethylene resin of the invention. Rather, the additional components are selected such as to support the advantageous properties of the multimodal ethylene resin of the invention and/or to support or enhance its particular suitability for a desired application. Other polymers comprised in the composition of the invention means polymers which do not qualify as a HMW interpolymer or a LMW polymer as defined herein. Advantageously, such polymers are compatible with the multimodal polyethylene resin of the invention. Preferred additional components are non-polymeric. Additives include processing aids, UV stabilizers, antioxidants, pigments or colorants. Most preferred are compositions comprising a preferred, more preferred or most preferred multimodal polyethylene resin of the invention.

The resins or compositions of the present invention can be used to manufacture a shaped article. Such article may be a single-layer or a multi-layer article, which is obtainable by suitable known conversion techniques applying heat, pressure or a combination thereof to obtain the shaped article. Suitable conversion techniques include, for example, blow-molding, co-extrusion blow-molding, injection molding, injection stretch blow molding, compression molding, extrusion, pultrusion, calendering and thermoforing. Shaped articles provided by the invention include, for example, films, sheets, fibers, profiles, moldings and pipes. Most preferred is a shaped article comprising or made from a preferred, more preferred or particularly preferred resin or composition of the present invention.

The multimodal polyethylene resins and compositions according to the present invention are particularly suitable for durable application, especially pipes—without the need for cross-linking. Pipes comprising at least one multimodal polyethylene resin as provided herein are another aspect of the present invention and include monolayer pipes as well as multilayer pipes, including multilayer composite pipes. Typically, the pipes of the invention comprise the multimodal polyethylene resin in form of a composition (formulation) which also contains a suitable combination of additives, e.g. an additive package designed for pipe applications, and/or one or more fillers. Such additives and additive packages are known in the art.

Monolayer pipes according to the present invention consist of one layer made from a composition according to the present invention comprising a multimodal polyethylene resin as provided herein and suitable additives typically used or suitable for pipe applications. Such additives include colorants and materials suitable to protect the bulk polymer from specific adverse environmental effects, e.g. oxidation during extrusion or degradation under service conditions, such as, for example, process stabilizers, antioxidants, pigments, metal de-activators, additives to improve chlorine resistance and UV protectors. Preferred multilayer composite pipes include metal plastic composite pipes and are pipes comprising one or more, e.g., one or two, layers comprising a composition according to the present invention and a barrier layer. Such pipes include, for example, three-layer composite pipes with the general structure PE/Adhesive/Barrier or Barrier/Adhesive/PE, or five-layer pipes with the general structure PE/Adhesive/Barrier/Adhesive/PE or Polyolefin/Adhesive/Barrier/Adhesive/PE. In these structures PE stands for polyethylene layers which can be made from the same or different polyethylene compositions, preferably a PE-RT comprising composition, including at least one multimodal polyethylene composition according to the present invention. Suitable polyolefins include, for example, high density polyethylene, polypropylene and polybutylene, homopolymers and interpolymers. Preferred is a multilayer composite pipe wherein at least the inner layer comprises a multimodal polyethylene resin according to the present invention in a non-crosslinked form. More preferred is a multilayer composite pipe, wherein both PE layers comprise a multimodal polyethylene resin according to the present invention. In multilayer pipes, e.g. in the three-layer and five-layer structures exemplified above, the barrier layer may be an organic polymer capable of providing the desired barrier properties, such as an ethylene-vinyl alcohol copolymer (EVOH), or a metal, for example, aluminum or stainless steel.

The resins and compositions provided by the present invention are particularly suitable for use in domestic and technical pipe applications required to be operable at higher temperatures, e.g. above 40° C., in particular in the range of from above 40° C. to about 80° C. Such pipe applications include, for example, hot water pipes, e.g. for drinking and/or sanitary purposes and underfloor heating pipes. Such pipes may be monolayer or multilayer pipes. Preferred pipes according to the invention meet the performance requirements as defined in the norms for hot water pipes, e.g. in ISO 10508. The multimodal polyethylene resin according to the present invention enables pipes combining an excellent high temperature performance, as reflected e.g. in an excellent Long Term Hydrostatic Strength at higher temperatures (well above 20° C.) with good flexibility. Good flexibility facilitates e.g. pipe installation. The pipes can be produced without cross-linking, which allows improved processing economics and subsequent welding.

For plastic pipe applications, circumferential (hoop) stress performance as set forth in ISO 9080 and ISO 1167 is an important requirement. The long term behaviour or lifetime of plastic pipes can be predicted based on creep rupture data and curves which establish the allowable hoop stress (circumferential stress) which a pipe can withstand without failure. Typically, for long term predictive performance testing, candidate pipe materials are subjected to various pressures (stresses) and the lifetime at a given temperature is determined. For extrapolations to a lifetime of 50 years, e.g. at 20° C. to 70° C., testing is also performed at higher temperatures. The measured lifetime curves at each temperature typically comprise a high stress, lower lifetime ductile failure mode and a lower stress, longer lifetime brittle failure mode. A schematic representation of typical lifetime curves is found at page 412, FIG. 5, of the publication by J. Scheirs et al., TRIP 4 (12), 1996, pages 408-415. The curves can be divided into three stages, stage I representing the ductile failure stage, stage II (knee) representing a gradual change in failure mode from ductile to brittle, and stage III representing the brittle failure stage. Of particular interest are stages II and III, because these stages control the lifetime of a pipe in practice. The pipes of the present invention show an excellent hoop stress performance particularly at higher temperatures.

The invention is further illustrated by the following Examples, which, however, shall not be construed as a limitation of the invention.

EXAMPLES

Melt indices are expressed as $I_2$ (determined according to ASTM D-1238, condition E, 190° C./2.16 kg). The ratio of $I_{10}$ (measured according to ASTM D-1238, Condition N, 190° C./10 kg) to $I_2$ is the melt flow ratio and designated as $I_{10}/I_2$.

Tensile properties, such as yield stress, yield strain, maximum tensile stress and maximum elongation, stress at break and strain at break are determined in accordance with ISO 527 with test specimen 5A at a test speed of 50 mm/min.

Izod impact properties are measured according to ASTM D-256.

Flexural modulus is measured according to ASTM D-790 and average hardness D is determined according to ASTM D-2240.

The multimodal polyethylene resin used in the experiments is a bimodal ethylene interpolymer having an $I_2$ of 0.85 g/10 min, a density of 0.940 g/ccm and an $I_{10}/I_2$ of 9.8. The resin is made by in-situ blending using (continuous) solution process technology and two sequentially operated reactors. The HMW ethylene interpolymer is a homogeneous, substantially linear ethylene/octene copolymer which is made in the primary reactor using a constrained geometry catalyst. Said HMW interpolymer has an $I_2$ of 0.034 g/10 min and a density of 0.921 g/ccm. The weight average molecular weight is 228,000 and the Mw/Mn ratio is 2.1. The LMW ethylene polymer is a heterogeneous, linear ethylene/octene copolymer having an $I_2$ melt index of 20 g/10 min and a density of 0.953 g/ccm. The weight average molecular weight of the LMW polymer is 52,100 and the Mw/Mn ratio is 3. The LMW ethylene polymer is made in the secondary reactor using a multi-site Ziegler-Natta (coordination) catalyst. The ratio of HMW copolymer to LMW copolymer in the bimodal polyethylene resin is 40 to 60.

The resin has the following tensile, impact and other properties (each given value represents the average of five measurements):

| | |
|---|---|
| Yield stress [MPa]: | 21 |
| Yield strain [%]: | 13 |
| Maximum tensile stress [MPa] | 36 |
| Maximum elongation [%] | 760 |
| Stress at break [MPa] | 36 |
| Strain at break [%] | 760 |
| Flexural modulus [MPa] | 955 |
| Hardness D | 61 |
| Izod at 20° C. [J/m] | 238 |
| Izod at −40° C. [J/m] | 8 |

Monolithic pipes made from the above resin are subjected to hydrostatic pressure testing using the test method described in ISO 1167 (1996) and water as the internal and external test medium. The pipes have nominal dimensions of 16 mm×2 mm.

The hoop stress results are given in Table 1.

| Temperature [° C.] | Hoop Stress [MPa] | Failure time [h]* | Failure Mode* |
|---|---|---|---|
| 20 | 10.57 | >3096 | |
| 20 | 10.54 | >10344 | |
| 20 | 10.44 | >10344 | |
| 20 | 10.40 | >4056 | |
| 20 | 10.32 | >4056 | |
| 80 | 5.65 | 656 | ductile |
| 80 | 5.59 | 1245 | ductile |
| 80 | 5.52 | >5952 | |
| 80 | 5.49 | >3600 | |
| 80 | 5.45 | >3600 | |
| 80 | 5.42 | >5952 | |
| 80 | 5.35 | >4056 | |
| 80 | 5.34 | >3600 | |
| 80 | 5.30 | >5952 | |
| 80 | 5.25 | >3600 | |
| 110 | 2.91 | >3912 | |
| 110 | 2.89 | >3912 | |
| 110 | 2.84 | >2616 | |
| 110 | 2.79 | >3912 | |
| 110 | 2.47 | >11976 | |
| 110 | 2.11 | >11976 | |

*">" indicates that the specimen is still under test without failure. In such cases, no failure mode can be indicated.

The pipes made from the bimodal polyethylene resin show an excellent hoop stress performance, especially at high(er) temperatures. Surprisingly, no knee (stage II) reflecting a change in failure mode from ductile to brittle is manifest, yet. Test results already go beyond the control points for PE-RT according to DIN 16883 (1.9 MPa/8760 h at 110° C.) and PEX according to ISO 10146 (2.5 MPa/8760 h at 110° C.).

What is claimed is:

1. A polyethylene resin having a multimodal molecular weight distribution, said resin being further characterized in that it:
   (a) has a density in the range from 0.935 g/ccm to 0.945 g/ccm, and
   (b) has a melt index ($I_2$) in the range from 0.1 g/10 min to 1.0 g/10 min, and
   (c) comprises 30 to 50 weight percent of a high molecular weight (HMW) component, and 70 to 50 weight percent of a low molecular weight (LMW) component; said weight percents being based on the total amount of polymer in the multimodal polyethylene resin, and wherein the HMW component comprises at least one high molecular weight ethylene interpolymer having a density in the range from 0.915 g/ccm to 0.935 g/ccm, and a melt index of 1.0 g/10 min or lower, and
   wherein the LMW component comprises at least one low molecular weight ethylene polymer having a density in the range from 0.945 g/ccm to 0.960 g/ccm, and a melt index in the range from 2.0 g/10 min to less than 200 g/10 min, and
   wherein the at least one high molecular weight interpolymer is a homogeneous ethylene interpolymer that has a single melting point between −30° C. and 150° C., and a CDBI greater than 50 percent; and the at least one low molecular weight ethylene polymer is a heterogeneous ethylene interpolymer that has a linear backbone, a DSC melting point greater than 115° C. attributed to a high density fraction, and a CDBI of 50 percent or less.

2. The polyethylene resin of claim 1, wherein the low molecular weight ethylene polymer has a density in the range from 0.950 g/ccm to 0.960 g/ccm, and a melt index in the range from 10 g/10 min to about 150 g/10 min.

3. The polyethylene resin of claim 1, wherein the low molecular weight ethylene polymer has a melt index in the range from 2 g/10 min to 20 g/10 min.

4. The polyethylene resin of claim 1, wherein the high molecular weight component is present in an amount from 40 to 50 weight percent, based on the total amount of polymer in the multimodal polyethylene resin, and the low molecular weight component is present in an amount from 60 to 50 weight percent, based on the total amount of polymer in the multimodal polyethylene resin.

5. A composition comprising a polyethylene resin and at least one other additional component, and
   wherein the polyethylene resin has a multimodal molecular weight distribution, and has the following properties:
   (a) a density in the range from 0.935 g/ccm to 0.945 g/ccm, and
   (b) a melt index ($I_2$) in the range from 0.1 g/10 min to 1 g/10 min, and
   wherein the polyethylene resin comprises 30 to 50 weight percent of a high molecular weight (HMW) component, and 70 to 50 weight percent of a low molecular weight (LMW) component; said weight percents being based on the total amount of polymer in the multimodal polyethylene resin, and
   wherein the HMW component comprises at least one high molecular weight ethylene interpolymer having a density in the range from 0.915 g/ccm to 0.935 g/ccm, and a melt index of 1.0 g/10 mm or lower, and
   wherein the LMW component comprises at least one low molecular weight ethylene polymer having a density in the range from 0.950 g/ccm to 0.960 g/ccm, and a melt index in the range from 2.0 g/10 min to less than 200 g/10 min, and
   wherein the at least one low molecular weight ethylene polymer is a heterogeneous ethylene interpolymer that has a CDBI of 50 percent or less.

6. The composition according to claim 5, wherein the at least one other additional component is selected from the group consisting of fillers and additives.

7. The composition of claim 5, wherein the at least one high molecular weight interpolymer is a homogeneous ethylene interpolymer that has a CDBI greater than 50 percent.

8. The composition of claim 5, wherein the low molecular weight ethylene polymer has a melt index in the range from 2 g/10 min to 20 g/10 min.

9. The composition of claim 5, wherein the high molecular weight component is present in an amount from 40 to 50 weight percent, based on the total amount of polymer in the multimodal polyethylene resin, and the low molecular weight component is present in an amount from 60 to 50 weight percent, based on the total amount of polymer in the multimodal polyethylene resin.

10. The composition of claim 5, wherein the high molecular weight interpolymer has a molecular weight distribution (Mw/Mn) less than about 3.5.

11. A shaped article comprising the composition of claim 5.

12. The shaped article according to claim 5, wherein the article is a pipe.

13. A shaped article comprising at least one component formed from the composition of claim 5.

14. The shaped article of claim 13, wherein the shaped article is selected from the group consisting of pipes, films, sheets, fibers, profiles and moldings.

15. A polyethylene resin having a multimodal molecular weight distribution, said resin being further characterized in that it:
  (a) has a density in the range from 0.925 g/ccm to 0.950 g/ccm, and
  (b) has a melt index ($I_2$) in the range from 0.1 g/10 min to 5 g/10 min, and
  (c) comprises a high molecular weight (HMW) component and a low molecular weight (LMW) component, and
  wherein the HMW component comprises at least one high molecular weight ethylene interpolymer having a density in the range from 0.910 g/ccm to 0.935 g/ccm, and a melt index of 1.0 g/10 min or lower, and
  wherein the LMW component comprises at least one low molecular weight ethylene polymer having a density in the range from 0.945 g/ccm to 0.965 g/ccm, and a melt index in the range from 2.0 g/10 min to less than 200 g/10 min, and
  wherein the at least one high molecular weight interpolymer is a homogeneous ethylene interpolymer that has a single melting point between −30° C. and 150° C., and a CDBI greater than 50 percent; and wherein the at least one low molecular weight ethylene polymer is a heterogeneous ethylene interpolymer that has a linear backbone, a DSC melting point greater than 115° C., attributable to a high density fraction, and a CDBI of 50 percent or less.

16. A composition comprising the polyethylene resin of claim 15 and at least one other additional component.

17. The composition of claim 16, wherein the low molecular weight ethylene polymer has a density in the range from 0.950 g/ccm to 0.960 g/ccm, and a melt index in the range from 10 g/10 min to about 150 g/10 min.

18. The composition of claim 16, wherein the low molecular weight ethylene polymer has a melt index in the range from 2 g/10 min to 20 g/10 min.

19. The composition of claim 16, wherein the high molecular weight interpolymer has a molecular weight distribution (Mw/Mn) less than about 3.5.

20. A shaped article comprising the composition of claim 16.

21. A shaped article comprising at least one component formed from the composition of claim 16.

22. The shaped article of claim 21, wherein the shaped article is selected from the group consisting of pipes, films, sheets, fibers, profiles and moldings.

* * * * *